(No Model.)

E. T. GREENFIELD.
CONDUIT FOR ELECTRIC CONDUCTORS.

No. 469,470. Patented Feb. 23, 1892.

Witnesses
C. E. Ashley
M. L. Butter

Inventor
Edwin T. Greenfield
By his Attorney
Charles J. Kintner

UNITED STATES PATENT OFFICE.

EDWIN T. GREENFIELD, OF NEW YORK, N. Y., ASSIGNOR TO THE INTERIOR CONDUIT AND INSULATION COMPANY, OF SAME PLACE.

CONDUIT FOR ELECTRIC CONDUCTORS.

SPECIFICATION forming part of Letters Patent No. 469,470, dated February 23, 1892.

Application filed August 14, 1891. Serial No. 402,601. (No model.)

*To all whom it may concern:*

Be it known that I, EDWIN T. GREENFIELD, a citizen of the United States, residing at New York, county and State of New York, have made a new and useful Improvement in Conduit Tubes or Pipes for Protecting or Surrounding Electrical Conductors, of which the following is a specification.

My invention is directed particularly to improvements in the joining of two or more sections of conduit-tubes; and it has for its object, first, perfect insulation at the joints, and, second, the production of a continuous metal shield or tube on the outer surface, which prevents the attacks of moisture, acids, alkalies, or vermin. I accomplish these objects by the use of the tube herein described, and particularly pointed out in the claims which follow this specification.

My invention will be fully understood by referring to the accompanying drawings, in which—

Figure 1:
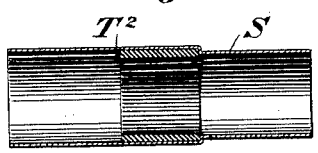
Figure 2:
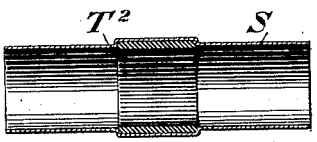
Figure 3:
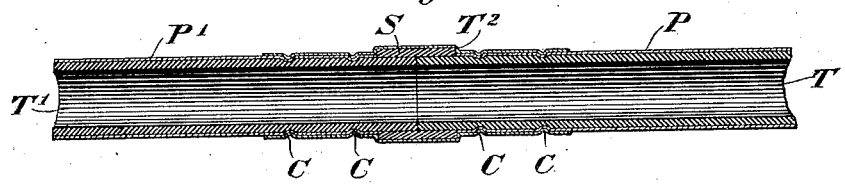
Figure 4:
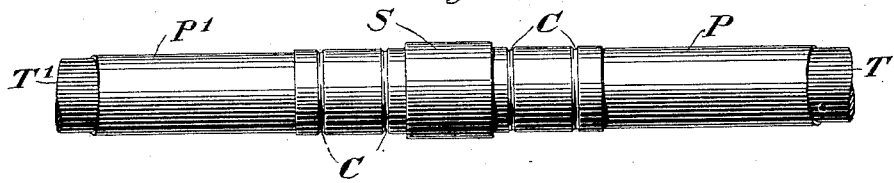
Figure 5:
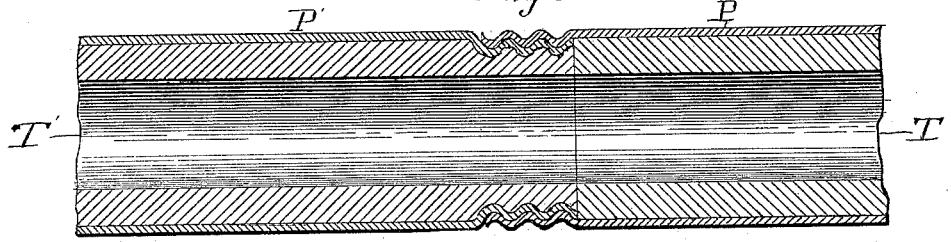

Figure 1 is a sectional view illustrating my improved junction collar or sleeve partially formed. Fig. 2 is a similar sectional view representing the completed sleeve or collar, and Fig. 3 is a longitudinal sectional view showing two sections of metal-covered tube or pipe joined together with my sleeve or collar. Fig. 4 is a side elevational view of the same. Fig. 5 is a longitudinal sectional view showing two metal-covered tubes joined together end to end in accordance with one form of my invention.

It is very desirable in the preparation of metal-covered insulated tubes or pipes used in the laying of electrical wires that the most perfect insulation be obtained at the joints of any two sections of the tube or pipe, and this is particularly true where metal-covered tubing is used, in view of the great conductivity of the covering. I accomplish this insulation by making a sleeve or collar of metal and inclosing within this collar an insulating-ring of the same internal diameter as the exterior diameter of the non-conducting portions of the tubes or pipes to be joined together.

A fuller understanding of the invention may be had by referring to the accompanying drawings in detail, in which S, Fig. 1, represents a metallic sleeve or collar, and $T^2$ an insulating-ring inserted therein. After this ring is inserted in the manner shown in Fig. 1 the left-hand portion of the sleeve or collar is made to assume the same conformation as the right hand, which may be done in any of the well-known manners of metal spinning or by a compression-die, as shown in Fig. 2. It will thus be seen that a sleeve or collar is formed having a central ring of insulating material of the same inner diameter as the sleeve itself.

I use metal-covered tubes covered, preferably, in the manner set forth in my application for a patent, filed May 13, 1891, bearing Serial No. 392,590; and I remove from the ends of these tubes a sufficient portion of the metal covering to equal the length of the insulating-ring $T^2$. I then cover both of these ends with an insulating cement and insert them within the sleeve or collar S and ring $T^2$, as clearly shown in Fig. 3, so that the abutting ends of the tubes T and T' fit snugly against each other within the insulating-ring $T^2$, and are cemented thereto, thus making a perfect water-tight joint. After the tubes are inserted in this position I crimp, corrugate, or otherwise indent the channels C C at each end of the sleeve S, thus forming an absolutely water-proof joint and at the same time a perfect conducting-joint between the metal portions S, P, and P'.

I do not limit myself to the specific manner herein described of producing a perfectly-insulated joint between two or more sections of metal-covered tubing, as I believe it is broadly new with me to provide an insulated collar around the ends of two adjoining sections of pipes or tubing and to surround both the ends of the tubes with a metal sleeve which joins them all together.

The metal sleeve S and metal coverings P P' may be joined together in the manner already described; or they may be soldered together or united in any way which will readily suggest itself to those skilled in the art of metal working. I prefer, however, to form the corrugations with a tool which indents the channels or rings C C, thus practically making a continuity of metal surface between these parts.

In Fig. 5 I have shown another manner in which I may join two or more metal-covered tubes together. In this figure of the drawings the tubes T T' abut against each other, and one of the metallic sleeves P or P' extends over the joint formed by the two abutting ends a sufficient distance to enable such extended portion to overlap the metallic covering of the other tube, after which they may be joined together by corrugating them, as described, and such a construction I regard as coming within the terms of my claims.

Although I regard the modified form shown in Fig. 5 as coming within the terms of my claims, the preferred form of my invention is shown in Figs. 3 and 4; and in practice I use this form in preference to that disclosed in Fig. 5 for the reason that through the increased security of insulation derived from the cemented ends of the tubes P and P', together with the insulating-collar S, I obtain better results than would be possible with my other modified construction.

I am aware that conduit-tubes have heretofore been constructed of metal provided with a non-conducting lining and joined together by a metallic collar provided also with a non-conducting lining, the ends of the tubes and the uniting-collar being screw-threaded, and I make no claim hereinafter broad enough to include such a construction.

Having thus described my invention, what I claim, and desire to secure by Letters Patent of the United States, is—

1. A junction sleeve or collar having a non-conducting ring embedded in its inner surface, substantially as described.

2. A pair of non-conducting tubes having their ends abutting against each other and surrounded by a non-conducting ring embedded in a metallic collar or sleeve, the ends of which fit tightly over the ends of the adjoining tubes, substantially as described.

3. A pair of non-conducting metal-covered tubes having the metal removed from their ends and abutting against each other, in combination with a non-conducting ring fitting snugly over the ends and a metal collar or sleeve uniting all of said parts together, substantially as described.

4. A pair of metal-covered non-conducting tubes surrounded at their abutting ends by a metal sleeve or collar, all of said parts being held together by corrugations extending through the sleeve, the metal coverings, and into the non-conducting tubes, substantially as described.

5. A pair of metal-covered tubes having the metal removed from their abutting ends and surrounded by a non-conducting ring embedded in a short metallic sleeve, the sleeve and the metal portions of the tubes being united together by corrugations or indentations, substantially as described.

6. A pair of non-conducting tubes having their ends united together by a non-conducting cement and surrounded by a non-conducting ring embedded in a metal sleeve, the ends of the sleeve and the metal portions of the tubes being united together by corrugations or indentations, substantially as described.

EDWIN T. GREENFIELD.

Witnesses:
C. J. KINTNER,
M. L. BUTLER.